(12) United States Patent
Magid

(10) Patent No.: US 6,532,289 B1
(45) Date of Patent: Mar. 11, 2003

(54) METHOD AND DEVICE FOR ECHO SUPPRESSION

(75) Inventor: Avi Magid, Givat Elah (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/197,263

(22) Filed: Nov. 20, 1998

(30) Foreign Application Priority Data

Nov. 28, 1997 (EP) ............................................. 97480081

(51) Int. Cl.[7] ................................................. H04M 1/00
(52) U.S. Cl. ............................... 379/406.01; 379/406.04
(58) Field of Search ........................ 379/406.07, 88.01, 379/88.02, 88.03, 88.07, 88.17, 406.01, 406.04, 406.05, 406.06, 406.08, 406.13, 406.14, 413.01

(56) References Cited

U.S. PATENT DOCUMENTS 5,668,794 A * 9/1997 McCaslin et al. ...... 379/406.07
6,226,380 B1 * 5/2001 Ding ...................... 379/413.01

OTHER PUBLICATIONS

Understanding Telephone Electronics: "T*The Conventional Telephone Set*" pp. 2–21 through 2–25.

* cited by examiner

Primary Examiner—Fan Tsang
Assistant Examiner—Jefferey Harold
(74) Attorney, Agent, or Firm—Scott W. Reid; John D. Flynn

(57) ABSTRACT

Echo suppression control device in a voice communication system wherein a reference signal is sent over the system from a transmitting apparatus and comprising an echo canceller (16) for removing any echo signal from a primary signal received by the transmitting apparatus, and a residual echo suppressor (20) for removing the residual echo at the output of the echo canceller. The residual echo suppressor comprises means (24) for identifying speech echo intervals during which the primary signal contains mainly echo of the reference signal, and a gain control unit (22) for computing an estimation of the residual echo level, computing a target level of the residual echo and computing a suppression gain G to be applied during the speech echo intervals to the residual echo signal obtained after the application of the echo canceller, this suppression gain being the ratio between the target residual echo and the residual echo level estimation.

21 Claims, 2 Drawing Sheets

METHOD AND DEVICE FOR ECHO SUPPRESSION

TECHNICAL FIELD OF THE INVENTION

The invention relates to echo cancellation and suppression in voice communication systems and more particularly a new echo canceling device wherein there is an adaptive suppression of the residual echo.

BACKGROUND ART

There are two kinds of echoes which may arise in a voice communication system: electrical echoes and acoustical echoes. The electrical echoes are due to impedance mismatch at the devices called <<hybrids>> where two-wire lines become four-wire lines. Hybrids are traditionally used when the two-wire local subscriber loop becomes a four-wire long distance trunk. In the telephony assisted by computer, the hybrid is also used at the point where the four wires (two wires from the microphone, and two wires from the loudspeaker) are converted into the two-wire local loop. The acoustic echo arises in a case when there is an acoustic path between the loudspeaker and the microphone so that part of the signal reproduced by the loudspeaker is reflected (weakened, delayed and distorted) by the room and then recorded by the microphone which is the typical situation when using a speakerphone.

Echo suppression is used to identify pure echo intervals in the primary signal which is a mixture of the signal received from the communication system and the echo signal, and suppress the echo signal therefrom. This method is usually effective, but it makes the conversation sound unnatural because of <<switching>> from an open channel (when primary side is talking to close channel and when primary signal consists mainly of echo) and vice versa. In double-talk situations (where both parties talk at the same time), the switching artifacts are very disturbing.

Echo cancellation is used to remove the echo part from the primary signal usually by means of adaptive filtering. In real environment, with non-linear effects and noticeable background noise, the echo is not perfectly canceled. Moreover, every change in the echo path (e.g. increasing the speakers volume or moving the microphone) will result in a loud echo until the system converges to the new path. The residual echo, though much less disturbing than the original one, can still be very annoying in some situations.

Suppression of residual echo left after echo cancellation is described in U.S. Pat. No. 5,563,944. When the residual primary level is small compared to the reference signal level, it is assumed to be echo and it is further suppressed by a predefined gain (in some systems background noise level is taken into account). The disadvantages of the existing methods are as follows:

1) The residual primary level can be high when the echo canceller does not perform well (e.g. when the canceller adapts to a new echo path). When this happens, the residual primary signal is not suppressed, even though it contains a strong echo.
2) When the system does suppress the residual echo, it usually uses a fix gain. Often the echo canceller performs well, and there is no need for strong suppression, which causes switching artifacts typical to echo suppression systems.

SUMMARY OF THE INVENTION

Accordingly, an object of the invention is to provide an echo canceling device wherein the residual echo is suppressed only by the amount needed to make it unnoticeable and thus avoiding switching artifacts.

The invention relates to an echo canceling device with adaptive suppression of residual echo in a voice communication system wherein a reference signal is sent over the system from a transmitting apparatus and comprising an echo canceller for removing any echo signal from a primary signal received by the transmitting apparatus, and a residual echo suppressor for removing the residual echo at the output of the echo canceller. Such a device is characterized in that the residual echo suppressor comprises means for defining speech echo intervals during which the primary signal contains mainly echo of the reference signal, first means for computing an estimation of the residual echo level, second means for computing a target level of residual echo, and third means for computing a suppression gain G to be applied during the speech echo intervals to the residual echo signal obtained after the application of the echo canceller, the suppression gain being the ratio between the target residual echo and the residual echo level estimation.

BRIEF DESCRIPTION OF THE DRAWINGS

These and other features, objects and advantages of the invention will become clear upon a consideration of the following detailed description of the invention when read in conjunction with the drawings in which.

DETAILED DESCRIPTION OF THE INVENTION

Figure 1:
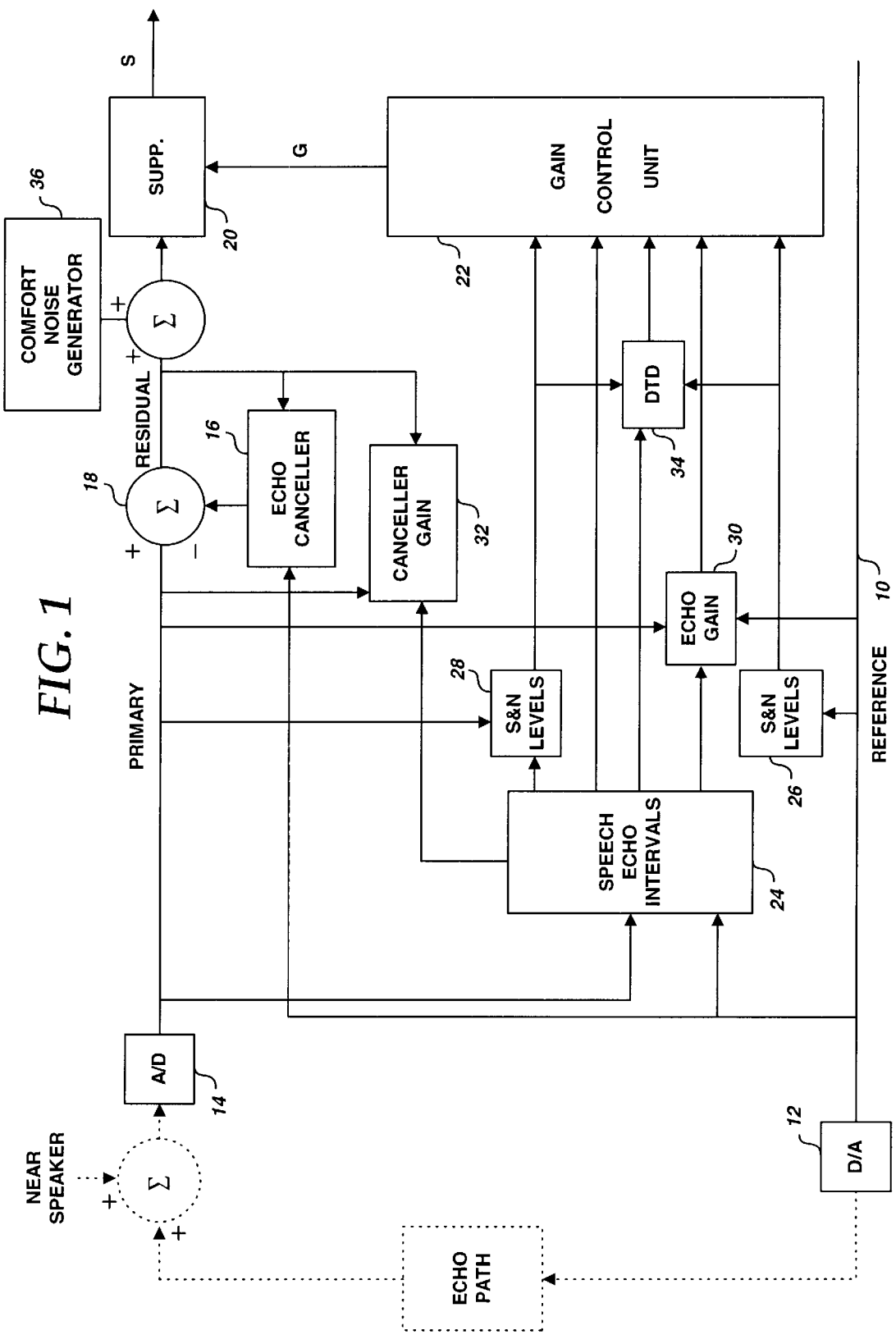
FIG. 1 is a schematic block diagram of the echo cancellation device according to a preferred embodiment of the invention.

An adaptive echo cancellation device used in a voice communication system is shown in FIG. 1. The reference signal in digital form on line 10 is converted into analog form by digital-to-analog converter 12 before being transmitted by the communication system. But due to a hybrid connection (echo path), an echo signal is sent back to the near side of the system as represented by dashed lines. The primary signal resulting from the conversion into digital form from analog-to-digital converter 14 consists of the echo mixed with the other signal.

Reference signal on line 10 is fed also to echo canceller 16 the coefficients of which are adapted according to an appropriate algorithm (such as NLMS algorithm) using the residual echo signal provided at the output of subtractor 18 in which an estimated echo signal provided by echo canceller 16 is subtracted from the primary signal. It must be noted that echo canceller 16 could use a signal furnished by a double-talk detector (DTD) to perform the necessary adaptation during the double-talk intervals. Then, the residual echo signal is processed in residual echo suppression unit 20 in order to cause minimal switching artifacts in processed signal S. Residual echo Suppressing unit 20 is controlled by gain G furnished by Gain control unit 22.

The parameters which are used by Gain control unit 22 for the implementation of the invention may be provided by the following units:

Speech Echo Intervals Identifying Unit 24

This unit is connected to both reference signal and primary signal, and identifies the intervals in which the primary signal contains mainly echo of the reference signal (mixed with background noise). For this, the unit can use a method correlating the reference and primary decimated signals. If the correlation exceeds a predetermined threshold (e.g., 0.9), the interval is considered as a <<speech echo interval>> in which further processing may be performed.

Reference Speech and Noise Level Estimation Unit 26

This unit connected to the reference signal, identifies the speech intervals by comparing the signal level to an adaptive threshold (e.g. double the long term average of the absolute reference signal) or by using speech features such as a voice activity detector. The reference speech level can be estimated by long term averaging of the reference signal during the speech intervals, and the reference background noise level can be estimated by long term averaging the noise signal during the non-speech intervals. Unit 26 provides REFERENCE SPEECH and REFERENCE NOISE signals.

Primary Speech and Noise Level Estimation Unit 28

This unit connected to the primary signal and to the speech echo intervals identifying unit 24, operates in the same way as reference speech and noise level estimation unit 26. But the estimation is disabled during the speech echo intervals identified by unit 24. Unit 28 provides PRIMARY SPEECH and PRIMARY NOISE signals.

Echo Gain Estimation Unit 30

This unit connected to the reference signal, to the primary signal and to speech echo intervals identifying unit 24 estimates the echo gain during speech echo intervals by averaging the ratio between the primary signal level and the reference signal level. Unit 30 provides ECHO GAIN signal.

Canceller Gain Estimation Unit 32

This unit connected to the primary signal, to the residual echo signal and to speech echo intervals identifying unit 24 estimates the cancellation gain during speech echo intervals by averaging the ratio between the residual echo signal and the primary signal. Unit 32 provides CANCELLATION GAIN signal.

Double-Talk Detecting (DTD) Unit 34

This unit connected to reference speech and noise level estimation unit 26, to primary speech and noise level estimation unit 28 and to speech echo intervals identifying unit 24, identifies <<double-talk intervals>> during which both reference and primary signals are speech signals and are not speech echo intervals. This unit is optional. Unit 34 provides DOUBLE-TALK GAIN signal Comfort Noise Generator (CNG) Unit 36

This unit adds noise to the residual echo signal after suppression of the echo signal by echo canceller 16, whereby the suppressed residual echo is masked by the comfort noise. This unit is optional. Unit 36 provides COMFORT NOISE GENERATOR signal Implementation of Gain Control Unit 22

Figure 2:
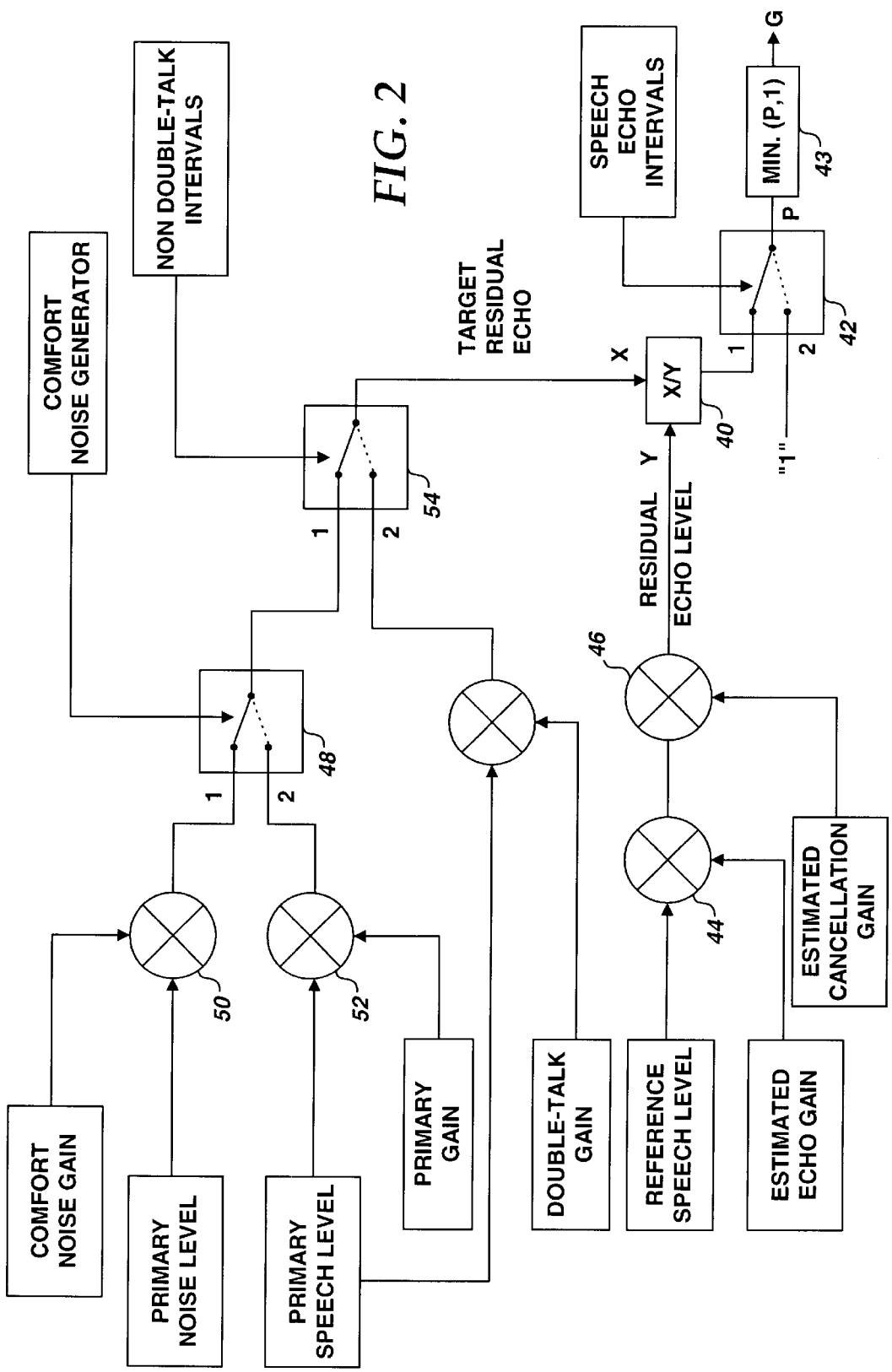
FIG. 2 is a schematic block diagram of the gain control unit included in the echo cancellation device illustrated in FIG. 1.

As illustrated in FIG. 2, the gain controlling signal G which is provided to residual echo suppressing unit 20 by gain control unit 22 is furnished by divider 40 which computes the ratio between a target residual echo X and the residual echo level Y. This ratio is input to a switching circuit 42 which is controlled by the speech echo intervals. During these speech echo intervals, switching circuit 42 selects the ratio X/Y whereas it selects a constant 1 otherwise. Since, in any case, gain G must not exceed the value 1, logic circuit 43 selects the minimum value between the output P of switching circuit 42 and constant 1.

GAIN G=MINIMUM (SUPPRESSION GAIN, 1)

During echo intervals, the residual echo level results from the product of reference speech level and the estimated echo gain in multiplier 44, multiplied by the estimated cancellation gain in multiplier 46.

RESIDUAL ECHO LEVEL=REFERENCE SPEECH×ECHO GAIN×CANCELLATION GAIN

The residual echo level is often not sufficiently low. The desired residual echo level is determined so that it will be unnoticeable. Three possible options for this target residual echo are explained hereafter with reference to FIG. 2.

1) The system uses a comfort noise generator (CNG) meaning that some kind of noise is added to the residual signal after suppression of the echo signal, whereby the suppressed residual echo is masked by the comfort noise. In such a case, switching circuit 48 is controlled by the comfort noise generator so as to be in position 1 selecting the target residual echo being the primary noise level multiplied by a predetermined comfort noise gain (say 0.2) in multiplier 50.

TARGET RESIDUAL ECHO=PRIMARY NOISE×COMFORT NOISE GAIN.

2) The system does not use comfort noise, meaning that output signal S is obtained by suppressing all the residual echo output from subtractor 18. In such a case switching circuit 48 in position 2 selects the target residual echo as being equal to the estimated primary speech level multiplied in multiplier 52 by a predetermined gain (for example 0.03)

TARGET RESIDUAL ECHO=PRIMARY SPEECH×PRIMARY GAIN

3) The third option depends on the use of a double-talk detector DTD within the system. If a DTD is used, a switching circuit 54 is controlled by the presence or not of double-talk. When there is no double-talk (DT intervals) switching circuit 54 is in position 1 selecting one of the two preceding options. When there is double-talk, switching circuit 54 is in position 2 selecting a target residual echo being equal to the primary speech level multiplied by a predetermined double-talk gain (say 0.1) in multiplier 56.

TARGET RESIDUAL ECHO=PRIMARY SPEECH×DOUBLE-TALK GAIN.

In the embodiment illustrated in FIG. 1, the functional blocks and in particular the gain control unit including the logical circuit represented in FIG. 2, can be implemented either by a suitably programmed general purpose digital signal processor (DSP), or by using special purpose hardware.

In conclusion, the echo canceling device which has been described in reference to FIGS. 1 and 2, offers the following advantages:

1) if the residual echo is low because the echo canceller is operating well or when the echo level is low to begin with, a little suppression is performed with a suppression gain close to 1, whereby switching artifacts are minimized.

2) if the residual echo is high because the echo canceller performance is not good enough, strong suppression is performed during echo intervals with a suppression gain close to 0.

While the invention has been described in detail herein in accord with certain preferred embodiments thereof, modifications and changes therein may be affected by those skilled in the art. Accordingly, it is intended by the appended claims to cover all such modifications and changes as fall within the true spirit and scope of the invention.

What I claim:

1. A method for echo cancellation in a voice communication system, the method comprising the steps of:
   removing an estimated echo signal from a primary signal to provide a residual echo signal;
   identifying speech echo intervals during which the primary signal contains mainly echo of a reference signal by correlating the reference signal and the primary signal, wherein an interval is identified as a speech echo internal when the correlation exceeds a first predetermined threshold;
   identifying reference speech and reference non-speech intervals within the reference signal by comparing the reference signal to an adaptive threshold computed as double the average of the absolute value of the reference signal;
   estimating the reference speech level by long term averaging of the reference signal during the reference speech intervals;
   estimating a reference background noise level by long term averaging of the reference signal during the reference non-speech intervals;
   estimating a residual echo level using the product of the reference speech level, an echo gain and a cancellation gain;
   determining a target residual echo; and
   suppressing the residual echo from the residual echo signal by applying a suppression gain (G) to the residual echo signal during the speech echo intervals, where the suppression gain is the ratio between the target residual echo and the residual echo level.

2. The method of claim 1, wherein the suppressing step uses a suppression gain G of 1 for intervals other then speech echo intervals.

3. The method according to claim 2, further comprising the step of:
   estimating the echo gain by averaging the ratio between the primary signal and the reference signal during speech echo intervals.

4. The method according to claim 2, further comprising the step of:
   estimating the cancellation gain by averaging the ratio between the residual echo signal and the primary signal during speech echo intervals.

5. The method according to claim 2, further comprising the steps of:
   identifying primary speech and primary non-speech intervals within the primary signal;
   estimating the primary speech level by long term averaging of the primary signal during the primary speech intervals; and
   estimating a primary background noise level by long term averaging the primary signal during the primary non-speech intervals.

6. The method according to claim 5, wherein the primary speech and primary non-speech intervals are identified by comparing the primary signal to an adaptive threshold computed as double the average of the absolute value of the primary signal during the intervals which are not identified as speech echo intervals.

7. The method according to claim 5, further comprising the step of:
   identifying double talk intervals as intervals when both the reference speech intervals and primary speech intervals coincide.

8. The method according to claim 7, wherein the target residual echo is determined by the product of the primary speech level and a predetermined double-talk gain, during double-talk intervals.

9. The method according to claim 7, wherein the target residual echo is determined by the product of the primary speech level and a predetermined primary gain, during the intervals which are not identified as double-talk intervals.

10. The method according to claim 7, further comprising the step of:
    adding noise to the residual echo signal using a comfort noise generator.

11. The method according to claim 10, wherein the target residual echo is determined by the product of the primary noise level and a predetermined comfort noise gain, during the intervals which are not identified as double-talk intervals.

12. An echo canceling device with adaptive suppression of residual echo in a voice communication system wherein a reference signal is sent over the system from a transmitting apparatus, the device comprising:
    an echo canceller for removing an estimated echo signal from a primary signal received by said transmitting apparatus to provide a residual echo signal;
    a speech echo identifying unit for correlating the reference signal and the primary signal and identifying speech echo intervals during which the primary signal contains mainly echo of the reference signal as those intervals during which said correlation exceeds a first predetermined threshold;
    a suppressing unit for repressing the residual echo at the output of said echo canceller by applying a suppression gain G to the residual echo signal as those intervals;
    a gain control unit for computing the suppression gain G applied by said unit, wherein the suppression gain G is the ratio between a target residual echo and a residual echo level during said speech echo intervals;
    a primary speech and noise estimation unit connected to the primary signal, to said speech echo identifying unit and to said gain control unit for identifying primary speech and non-speech intervals by comparing the primary signal to an adaptive threshold computed as double the average of the absolute value of the primary signal during intervals not identified as speech echo intervals, for determining a primary noise level by long term averaging the primary signal during primary non-speech intervals, and for determining a primary speech level by long term averaging the primary signal during primary speech intervals;
    a reference speech and noise estimation unit connected to the reference signal and to said gain control unit for identifying reference speech and reference non-speech intervals by comparing the reference signal to an adaptive threshold computed as double the average of the absolute value of the reference signal, for determining a reference noise level by long term averaging the reference signal during reference non-speech intervals, and for determining a reference speech level by long term averaging the reference signal during reference speech intervals;
    a canceller gain estimation unit connected to the primary signal, to said echo canceller output, to said speech echo identifying unit and to said gain control unit for determining an estimated cancellation gain; and
    an echo gain estimation unit connected to the primary and reference signals, to said speech echo identifying unit and to said gain control unit for determining an estimated echo gain.

13. The echo canceling device according to claim 12, wherein the suppression gain G is 1 for intervals other than speech echo intervals.

14. The echo canceling device according to claim 13 wherein the residual echo level is estimated using the product of the reference speech level, the echo gain and the cancellation gain.

15. The echo canceling device according to claim 14, wherein the echo gain is estimated by averaging the ratio between the primary signal and the reference signal during speech echo intervals.

16. The echo canceling device according to claim 14, wherein the cancellation gain is estimated by averaging the ratio between the residual echo signal and the primary signal during speech echo intervals.

17. The echo canceling device according to claim 14, further comprising:
   a double talk detecting unit connected to said primary and reference speech and noise estimation units, said speech echo identifying unit and said gain control unit, for identifying double talk intervals as intervals when both reference speech intervals and primary speech intervals coincide.

18. The echo canceling device according to claim 14, wherein the target residual echo is determined by the product of the primary speech level and a predetermined double-talk gain, during double-talk intervals.

19. The echo canceling device according to claim 14, wherein the target residual echo is determined by the product of the primary speech level and a predetermined primary gain, during the intervals which are not identified as double-talk intervals.

20. The echo canceling device according to claim 14, further comprising:
   a comfort noise generator connected to said echo canceller output and said suppressing unit for adding noise to the residual echo signal.

21. The echo canceling device according to claim 20, wherein the target residual echo is determined by the product of the primary noise level and a predetermined comfort noise gain, during the intervals which are not identified as double-talk intervals.

* * * * *